(12) United States Patent
Yu

(10) Patent No.: US 7,773,319 B2
(45) Date of Patent: Aug. 10, 2010

(54) LENS WITH COLLAR AND LENS MODULE USING SAME

(75) Inventor: Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 29 days.

(21) Appl. No.: 12/061,893

(22) Filed: Apr. 3, 2008

(65) Prior Publication Data
US 2009/0052063 A1 Feb. 26, 2009

(30) Foreign Application Priority Data
Aug. 23, 2007 (CN) .......................... 2007 1 0201442

(51) Int. Cl.
*G02B 7/02* (2006.01)

(52) U.S. Cl. ...................................... 359/811; 359/819
(58) Field of Classification Search ................ 359/811, 359/819
See application file for complete search history.

(56) References Cited

U.S. PATENT DOCUMENTS

| 4,662,717 A * | 5/1987 | Yamada et al. ............... 359/362 |
| 6,072,634 A | 6/2000 | Broome et al. |
| 2006/0171046 A1 * | 8/2006 | Recco et al. .................. 359/811 |

* cited by examiner

*Primary Examiner*—William C Choi
(74) *Attorney, Agent, or Firm*—Andrew C. Cheng

(57) ABSTRACT

An exemplary lens includes an active part configured for refracting light transmitting therethrough, an inactive part surrounding the active part, and a collar formed on a surface of the inactive part.

11 Claims, 6 Drawing Sheets

30

LENS WITH COLLAR AND LENS MODULE USING SAME

BACKGROUND

1. Technical Field

The present invention relates to optical imaging devices and, particularly, to a lens with a collar and a lens module using the same.

2. Description of Related Art

With the development of optical imaging technology, electronic devices, such as digital cameras and mobile phones to name a few, adopting imaging technology has been introduced and marketed.

A typical lens module 40 is shown in FIG. 6. The lens module 40 includes a barrel 42, a first lens 44, a second lens 46, and a spacer 48 received in the barrel 42. The spacer 48 is sandwiched between the first lens 44 and the second lens 46. The first lens 44 includes an active part 442 and an inactive part 444 surrounding the active part 142. The active part 442 is configured for refracting light transmitting therethrough. The inactive part 444 has a first flat surface (not labeled). Similarly, the second lens 46 includes an active part 462 and an inactive part 464. The inactive part 464 has a second flat surface (not labeled). A first side of the spacer 48 contacts the first flat surface of the inactive part 444, and an opposite second side of the spacer 48 contacts the second flat surface of the inactive part 464. In assembly, the first lens 44, the spacer 48, and the second lens 46 are in this order placed into the barrel 42.

In the above lens module 40, the second lens 46 is engaged with the first lens 44 via the spacer 48. Due to accumulated errors during assembly of the spacer 48 and the second lens 46, an optical axis (not labeled) of the second lens 46 may deviate from that of the first lens 44. Accordingly, imaging quality of such a lens module 10 deteriorates, directly depending on the deviation between the two optical axes.

Therefore, a new lens and a new lens module are desired to overcome the above mentioned problems.

SUMMARY

An exemplary lens includes an active part configured for refracting light transmitting therethrough, an inactive part surrounding the active part, and a collar formed on a surface of the inactive part.

An exemplary lens module includes a barrel, a first lens received in the barrel, and a second lens received in the barrel. The first lens includes a first active part configured for refracting light transmitting therethrough, a first inactive part surrounding the first active part, and a first collar formed on a surface of the first inactive part. The first collar includes a first inner surface and a first outer surface. The second lens includes a second active part, a second inactive part surrounding the second active part, and a second collar extending from a surface of the second inactive part. The second collar includes a second inner surface and a second outer surface. The second collar is engaged with the first collar in such a manner that the second inner surface is in contact with the first outer surface.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
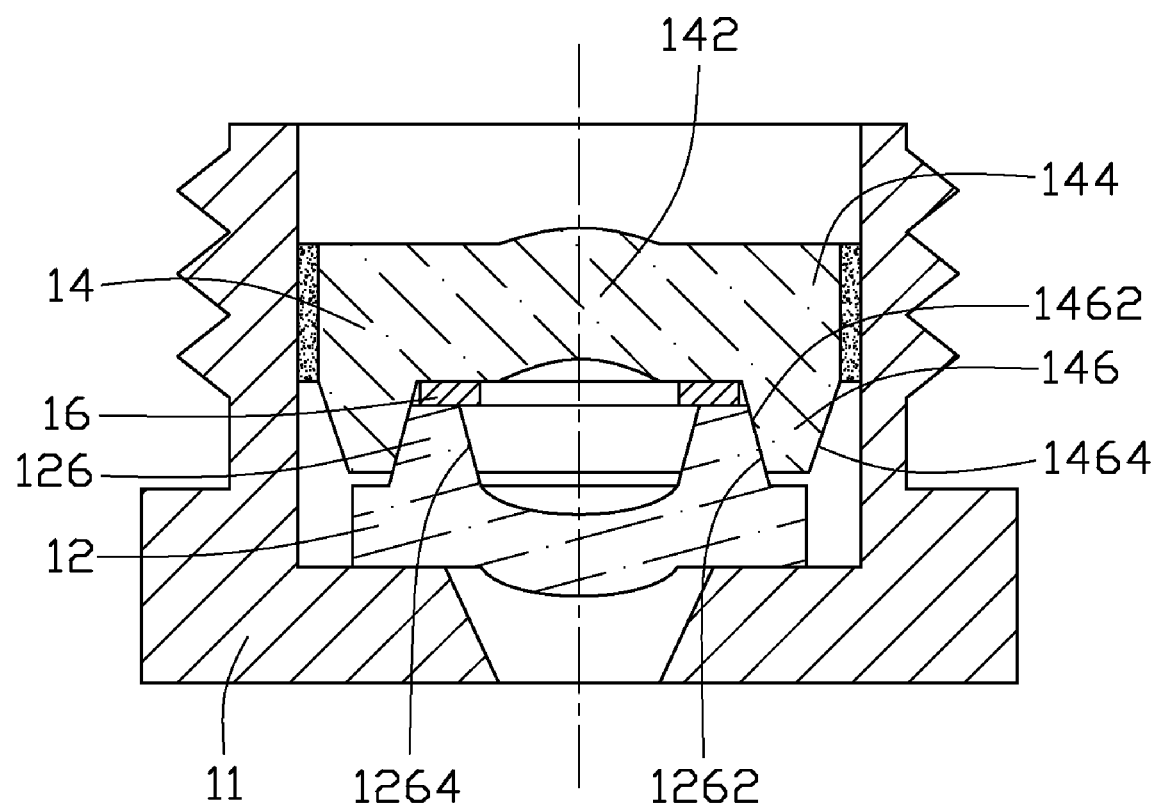
FIG. 1 is a schematic, side cross-sectional view of a lens module, according to a first embodiment.

Referring to FIG. 1, a lens module 10 of a first embodiment is shown. The lens module 10 includes a barrel 11, a first lens 12, a second lens 14, and a light blocking plate 16. The first lens 12 and the second lens 14 are received in the barrel. The light blocking plate 16 is sandwiched between the first lens 12 and the second lens 14.

Figure 2:
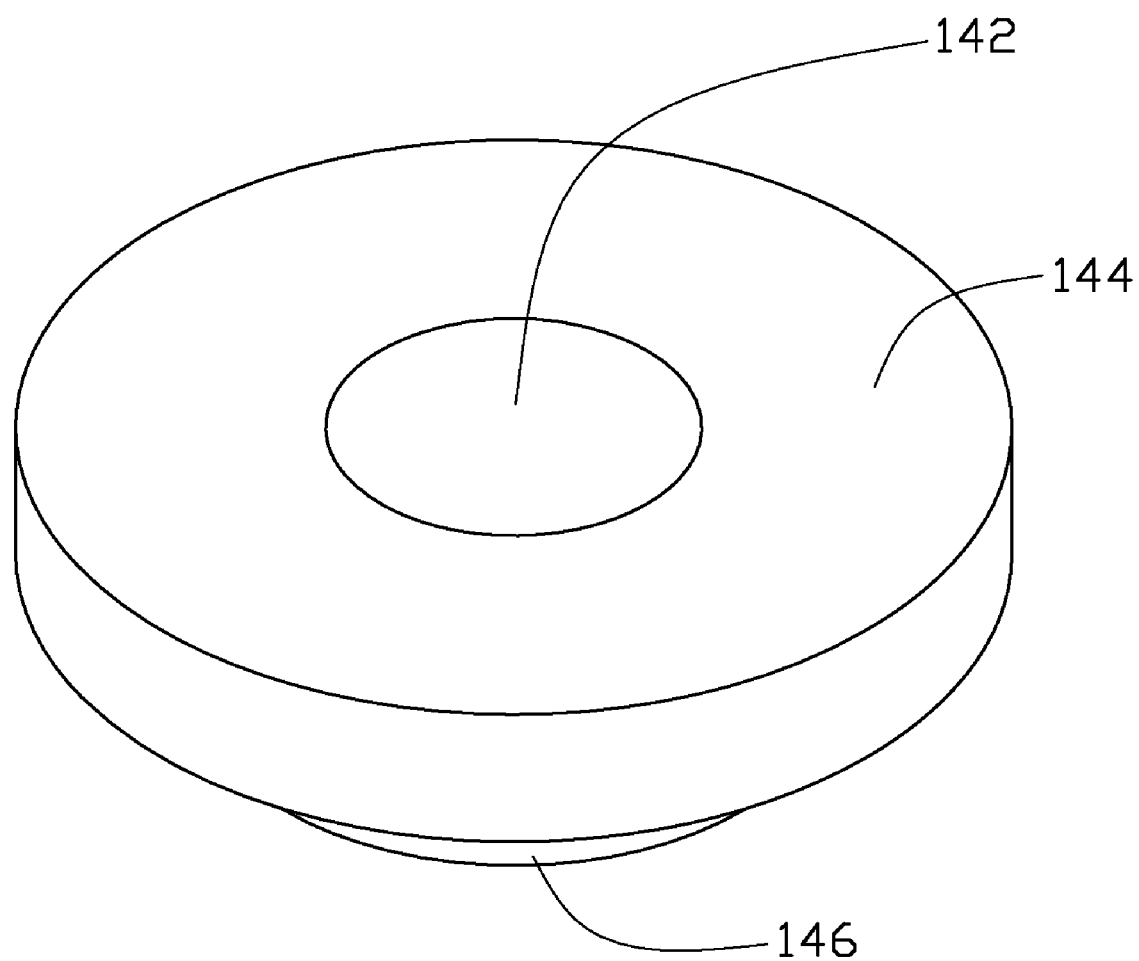
FIG. 2 is a schematic, perspective view of a lens of the lens module of FIG. 1.
Figure 3:
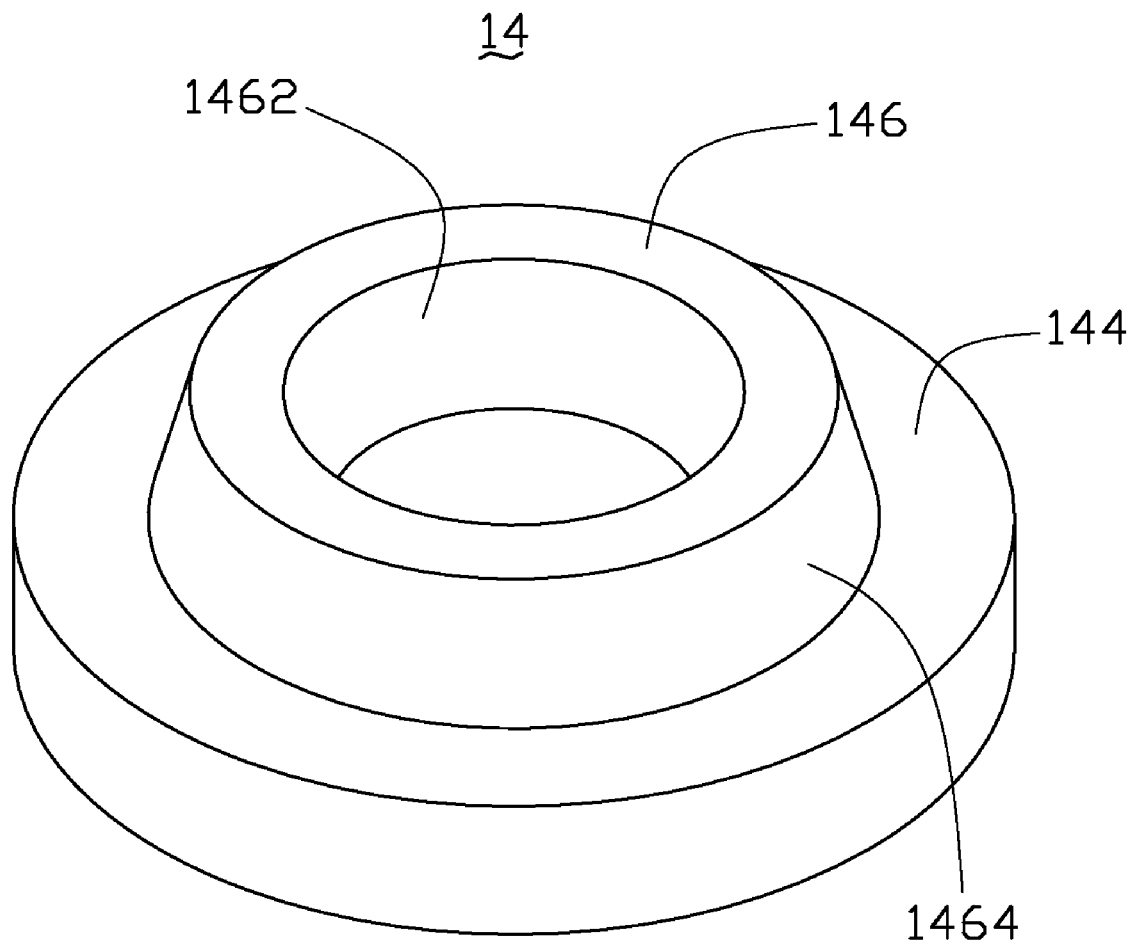
FIG. 3 is a schematic, perspective inverted view of the lens of FIG. 2.

Referring to FIGS. 1-3, the second lens 14 includes an active part 142, an inactive part 144 surrounding the active part 142, and a first collar 146 on a surface (not labeled) of the inactive part 144. The active part 142 is configured for refracting light traveling through the second lens. The first collar 146 extends outwardly in a direction parallel to an optical axis (not labeled) of the second lens 14 from the inactive part 144. The first collar 146 defines a receiving space (not labeled) therein. The first collar 146 is configured (i.e., structured and arranged) for engaging with the first lens 12. In the present embodiment, the first collar 146 is a cylindrical wall. It should be noted that the first collar 146 can also be a discontinuous ring shape. The first collar 146 has an inner surface 1462 and an outer surface 1464.

The first collar 146 has a trapezoid side cross-section. A shorter side of the two parallel sides of the trapezoid is at a distal end of the inactive part 144. That is, the collar 146 tapers in a direction away from the active part 144. In addition, the outer surface 1464 also slants obliquely relative to a surface normal of the active part 142 in the present embodiment. The configuration of the second lens 14 allows it to be easily released from an injection molding mold.

Referring to FIG. 1, similarly to the second lens 14, the first lens 12 includes a second collar 126, and the second collar 126 has an inner surface 1264 and an outer surface 1262. The inner surface 1264 can be oblique relative to an active part (not labeled) of the first lens 12.

During assembly, the second lens 14 is coupled directly onto the first lens 12 and they are positioned relative to each other by the circular walls instead of adopting a spacer sandwiched between the first lens 12 and the second lens 14. Because the inner surface 1462 of the second lens 14 is in direct contact with the outer surface 1262 of the first lens 12, the second lens 14 is in a substantially precise optical alignment with the first lens 12. I.e., an optical axis (not labeled) of the first lens 12 is aligned along the optical axis of the second lens 12.

The inner surface 1462 and the outer surface 1262 are both oblique in the present embodiment. The two oblique surfaces can be obtained using an ultraprecision machine. A slope of the outer surface 1262 is the same as that of the inner surface 1462. Because the slope of the outer surface 1262 is the same as the inner surface 1462 of the second lens 14, precise optical alignment of the first and second lenses 12, 14 is achieved. Furthermore, the two oblique surfaces 1264, 1464 facilitate assembling the second lens 14 to the first lens 12.

A method for assembling the lens module 10 includes the steps of:

inserting the first lens 12 into the barrel 11;

disposing the light blocking plate 16 on the first lens 12;

placing the second lens 14 into the barrel 11 in such a manner that the outer surface 1262 contacts the inner surface 1462 and guides/slides the second lens 14 to a precise optical alignment with the first lens 12;

applying an adhesive substance between the barrel 11 and the side surface of the second lens 14, thus securing the first lens 12 and the second lens 14 in the barrel.

Figure 4:
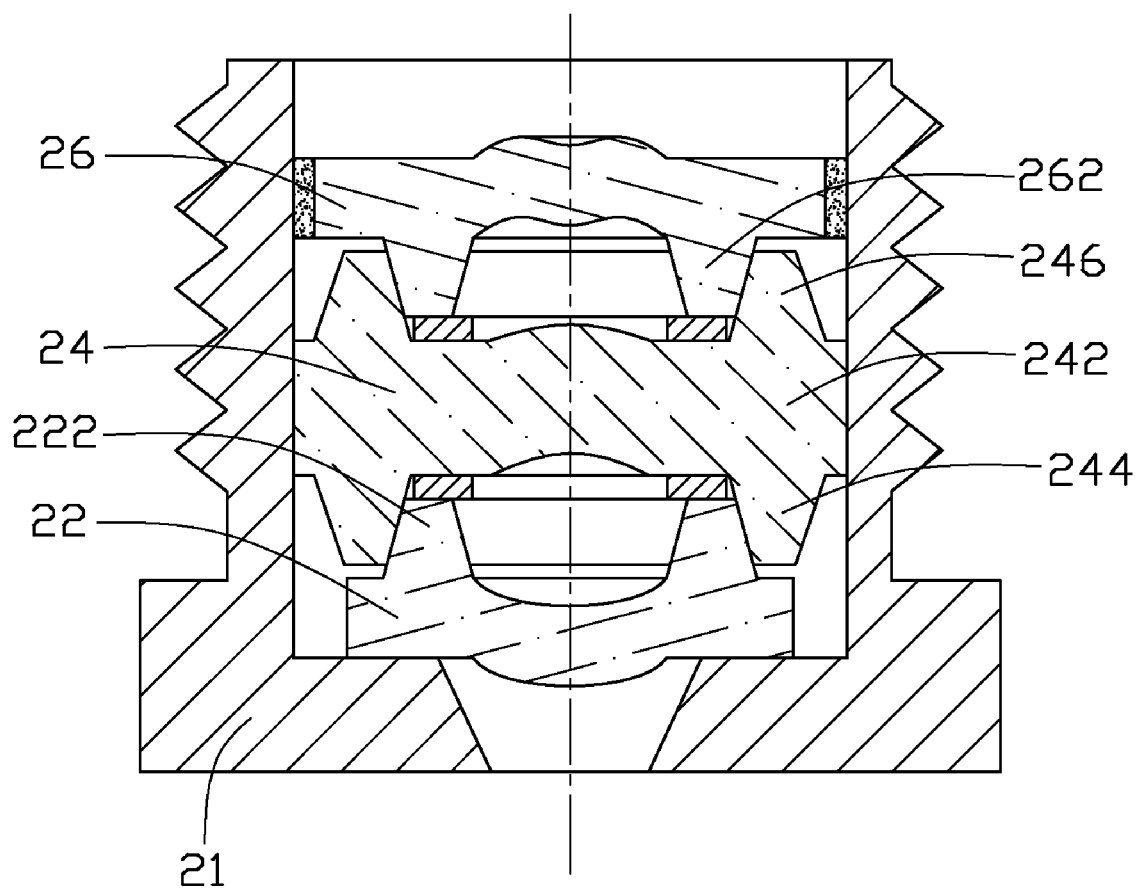
FIG. 4 is a schematic, side cross-sectional view of a lens module, according to a second embodiment.

Referring to FIG. 4, a lens module 20 of a second embodiment is shown. Similar to the lens module 10, the lens module 20 includes a first lens 22, a second lens 24, and a third lens. The first lens 22 has a first collar 222. The second lens 24 has a second collar 244 and a third collar 246 each extending from opposite sides of the 24 at an inactive part 242 correspondingly. The third lens 26 has a fourth collar 262 extending vertically from a surface (not labeled) of the inactive part (not labeled) of the third lens 26. The second collar 244 is for engaging with the first collar 222, and the third collar 246 is for engaging with the fourth collar 262. Due to such a configuration, the first lens 22 and the third lens 26 are in precise optical alignment with the second lens 24.

Figure 5:
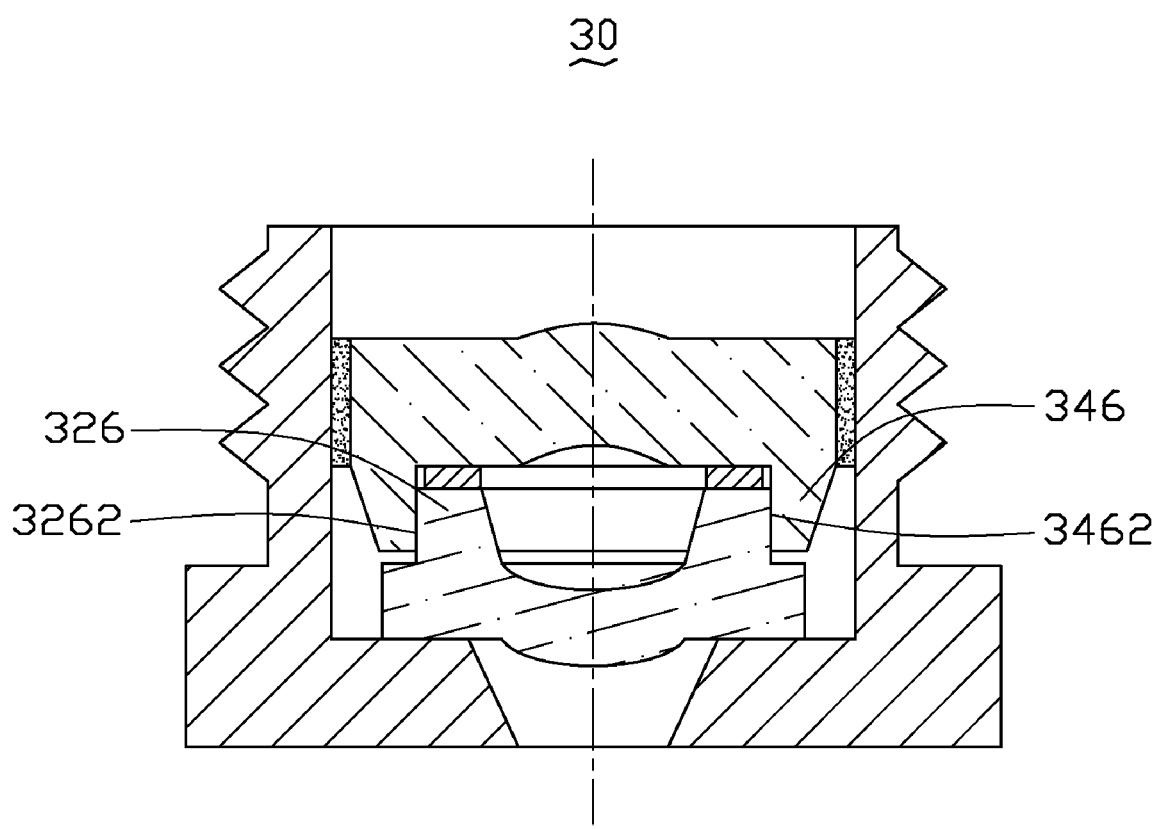
FIG. 5 is a schematic, side cross-sectional view of a lens module, according to a third embodiment.
Figure 6:
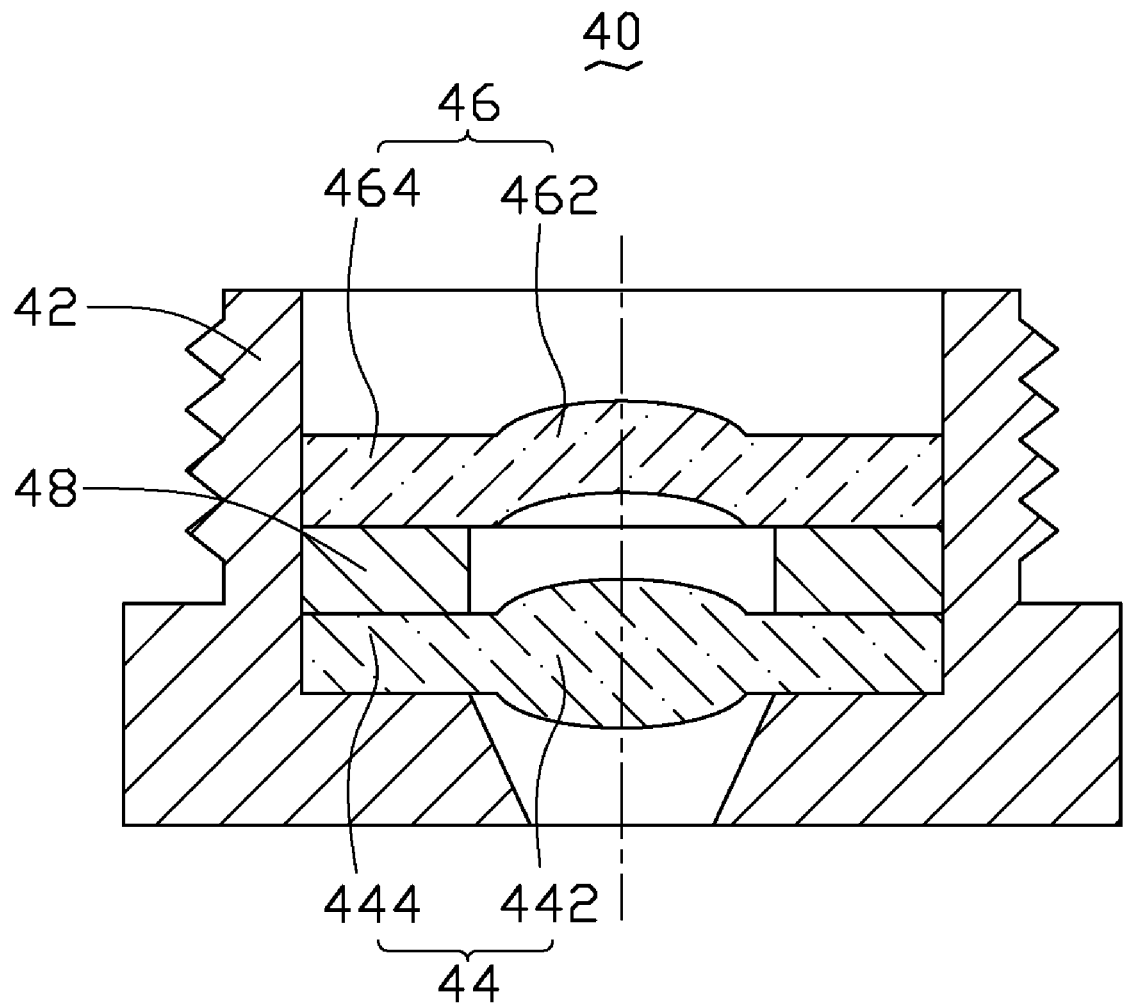
FIG. 6 is a schematic, side cross-sectional view of a typical lens module.

Referring to FIG. 5, a lens module 30 of a third embodiment is shown. The lens module 30 is similar to the lens module 10, except that an inner surface 3462 of a first collar 346 and an outer surface 3262 of a second collar 326 are both vertically straight.

While certain embodiments have been described and exemplified above, various other embodiments from the foregoing disclosure will be apparent to those skilled in the art.

The present invention is not limited to the particular embodiments described and exemplified but is capable of considerable variation and modification without departure from the scope of the appended claims.

What is claimed is:

1. A lens comprising:
   an active part configured for refracting light transmitting therethrough;
   an inactive part surrounding the active part; and
   a collar formed on a surface of the inactive part, wherein the collar comprises an inner surface and an outer surface, the inner surface being vertical relative to the active part and the outer surface being oblique relative to the active part.

2. The lens as claimed in claim 1, wherein the collar is ring-shaped.

3. The lens as claimed in claim 1, wherein the collar tapers in a direction away from the active part.

4. The lens as claimed in claim 1, wherein the collar extends outwardly in a direction parallel to an optical axis of the lens.

5. A lens module comprising:
   a barrel;
   a first lens received in the barrel, the first lens comprising a first active part configured for refracting light transmitting therethrough, a first inactive part surrounding the first active part, and a first collar formed on a surface of the first inactive part, the first collar comprising a first inner surface and a first outer surface; and
   a second lens received in the barrel, the second lens comprising a second active part configured for refracting light transmitting therethrough, a second inactive part surrounding the second active part, and a second collar formed on a surface of the second inactive part, the second collar comprising a second inner surface and a second outer surface, wherein the second collar is engaged with the first collar in such a manner that the second inner surface is in contact with the first outer surface, the first outer surface is vertical relative to the first active part, and the second inner surface is vertical relative to the second active part.

6. The lens module as claimed in claim 5, wherein the first collar is ring-shaped.

7. The lens module as claimed in claim 5, wherein the second collar is ring-shaped.

8. The lens as claimed in claim 5, wherein the collar tapers in a direction away from the active part.

9. The lens module as claimed in claim 5, wherein the first inner surface is oblique relative to the first active part.

10. The lens module as claimed in claim 5, wherein the second outer surface is oblique relative to the second active part.

11. A lens module comprising:
    a barrel;
    a first lens received in the barrel, the first lens comprising a first active part configured for refracting light transmitting therethrough, a first inactive part surrounding the first active part, and a first ring-shaped collar extending from a surface of the first inactive part, the first ring-shaped collar defining a receiving space therein; and
    a second lens received in the barrel, the second lens comprising a second active part configured for refracting light transmitting therethrough, a second inactive part surrounding the second active part, and a second ring-shaped collar extending from a surface of the second inactive part, wherein the second ring-shaped collar is received in the accommodating room, an inner surface of the first ring-shaped collar contacts an outer surface of the second ring-shaped collar, the inner surface of the first ring-shaped collar is vertical relative to the first active part, and the outer surface of the second ring-shaped collar is vertical relative to the second active part.

* * * * *